United States Patent [19]

Gemmani

[11] Patent Number: 5,090,460
[45] Date of Patent: Feb. 25, 1992

[54] MOLDING MACHINES FOR WOODWORKING

[75] Inventor: Giuseppe Gemmani, Rimini, Italy

[73] Assignee: SCM S.p.A., Rimini, Italy

[21] Appl. No.: 652,114

[22] Filed: Feb. 6, 1991

[30] Foreign Application Priority Data

May 24, 1990 [IT] Italy ................................ 3519 A/90

[51] Int. Cl.⁵ ........................ B27C 9/00; B27C 5/00
[52] U.S. Cl. ........................ 144/134 R; 144/3 R;
    144/116; 144/242 C; 144/252 R; 144/249 R
[58] Field of Search .......... 144/1 R, 2 R, 3 R, 114 R,
    144/116, 117 R, 134 R, 136 R, 242 R, 242 B,
    242 C, 249 R, 252 R

[56] References Cited

U.S. PATENT DOCUMENTS

| | | | |
|---|---|---|---|
| 701,104 | 5/1902 | Thomas | 144/116 |
| 2,102,186 | 12/1937 | Nicholson et al. | 144/116 |
| 3,082,802 | 3/1963 | Dickson et al. | 144/252 R |
| 3,367,377 | 2/1968 | Mitten | 144/252 R |
| 4,196,760 | 4/1980 | McDaniel et al. | 144/3 R |
| 4,993,464 | 2/1991 | Englert | 144/3 R |
| 5,007,469 | 4/1991 | Englert | 144/252 |

*Primary Examiner*—W. Donald Bray
*Attorney, Agent, or Firm*—Darby & Darby

[57] ABSTRACT

In a through feed molder, at least one of the horizontal tools is equipped with a dust hood that also carries the two-hold-down guides rigidly attached one on each side. The hood is connected to the tool slide by way of a mechanism that permits matching of the clearance between the hood and the horizontal bed of the molder to a given tool reference diameter. Uninterrupted progress of the work is ensured by an additional feed wheel mounted to a back rail and internally of a recess in the hold-down guide which immediately follows the tool along a feed path.

4 Claims, 3 Drawing Sheets

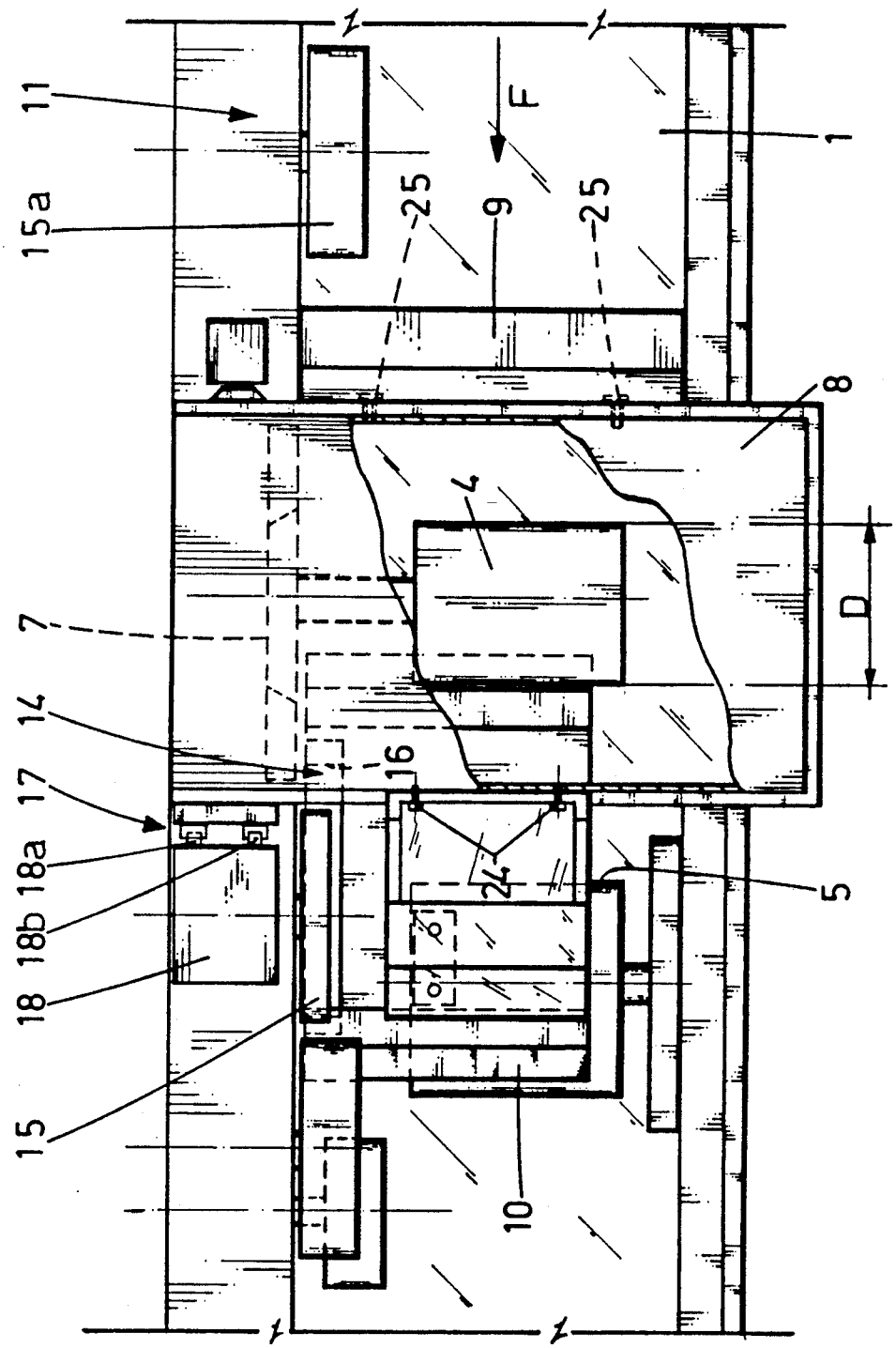

MOLDING MACHINES FOR WOODWORKING

BACKGROUND OF THE INVENTION

The present invention relates to an improvement in molding machines for woodworking.

Manufacturers of woodworking machines, and through-feed molders in particular, continuously research the possibilities of enhancing the quality of the machining produced by such equipment and the possibilities of reducing down time to the minimum obtainable.

In the case of through feed molders, which are designed to machine one or more of the four faces of a quadrangular-section stock supplied from a feed line, it has been found that the operations of changing to different tools (or size of the stock) can be notably lengthy and laborious.

The tools which are utilized number at least one for each face or side of the work but can be more, depending on the type of machining to be executed. The tools are arranged in line along a horizontal bed.

The work is fed by wheels (rubber faced, or steel) positioned between the tools and rotating about shafts parallel with the bed. The tools are supported by and driven together from a back rail in such a way that work pieces are directed continuously along the feed path and into engagement with the tools.

SUMMARY OF THE INVENTION

Four tool heads, each relating to a particular face of the work (taken along the feed direction, right side, left side, top and bottom respectively) are positioned internally of protective and dust extraction casings or hoods. The hoods are provided with two elements, disposed one on each side and located externally of the casing, by which the work is held down going into, through and beyond the cutting stroke. More exactly, the first hold-down element encountered by the work piece is angled in order to direct the work onto the tool, whereas the second hold-down element is positioned parallel to the bed and distanced therefrom at a height that will depend on the prescribed thickness of the machined work.

To reiterate, the operation of replacing any one of the tools is lengthy and laborious. In effect, the operator initially must detach the two hold-down elements, separating them from the supporting back rail, before a single tool can be removed. The replacement tool must then be aligned with the bed (according to the new diameter), using handwheels and graduated scales available on the machine, by means of which the operator can check and adjust the distance (height) of the axis of rotation of the tool from the bed. This accomplished, the two hold-down elements must be repositioned to suit the diameter of the new tool. The plane occupied by the hold-down elements coincides with the cutting edge at the smallest diameter of the tool, and its distance from the bed (equivalent to the thickness of the work).

It will be clear enough from this brief outline that the change procedure for each tool requires a considerable length of time for the operator to accomplish. Additionally, the precision with which the replacement tool and the hold-down elements are repositioned is dependent in most instances on the skill and experience of the operator.

A further drawback affecting through feed molders is caused by the considerable distance between centers of the feed wheel positioned immediately preceding the horizontal tools, and the first wheel encountered thereafter. This distance clearly represents a source of difficulty when the work to be machined has a length less than the distance in question. The workpiece will tend to stand still for lack of driving contact as soon as it is past the first of the two horizontal tools, being unable to reach the next wheel that is located after the second horizontal tool, until jogged forward by a further workpiece.

This is a defect attributable to the conventional architecture of current machines, in which the distance between centers of the horizontal tools is extremely limited and disallows the interposition even of a single feed wheel, due to the presence of the second hold-down element and to the fact that the hold-down element is connected directly to the back rail.

Accordingly, an object of the present invention is to overcome the drawbacks in question by reordering a molding machine in such a way as to optimize tool change operations, and at the same time to ensure uninterrupted progress of the work along the entire length of the feed path.

The stated object is realized in an improvement according to the present invention, whereby the hood covering one of the horizontal molding tools serves also to support two hold-down guides, one connected rigidly on each side. Means are incorporated, operating between the hood and the slide, by which to adjust the distance of the hood from the horizontal bed in keeping with a reference diameter assigned to the tool. Moreover, the second of the two hold-down guides encountered by the work piece has a recess in which to receive one of the feed wheels mounted to a back rail of the machine.

BRIEF DESCRIPTION OF THE DRAWINGS

The invention will now be described in detail, by way of example, with the aid of the accompanying drawings, in which:

FIG. 3 is a plan view of the tool of FIG. 2 from above, with certain parts omitted to better illustrate other parts.

DESCRIPTION OF THE PREFERRED EMBODIMENTS

With reference to the drawings, the improvement in molding machines for woodworking in accordance with invention relates to through feed molders of the type comprising a set of spindle heads installed in-line along a horizontal bed 1 and having a plurality of tools 2, 3, 4 and 5 (see FIG. 1) by which the four faces of a workpiece 6 are machined. In relation to the path F followed by the work 6, the four tools are designated right hand vertical, left hand vertical, top horizontal and bottom horizontal respectively, indicating the face of the work 6, which is machined by the corresponding tool.

Figure 1:
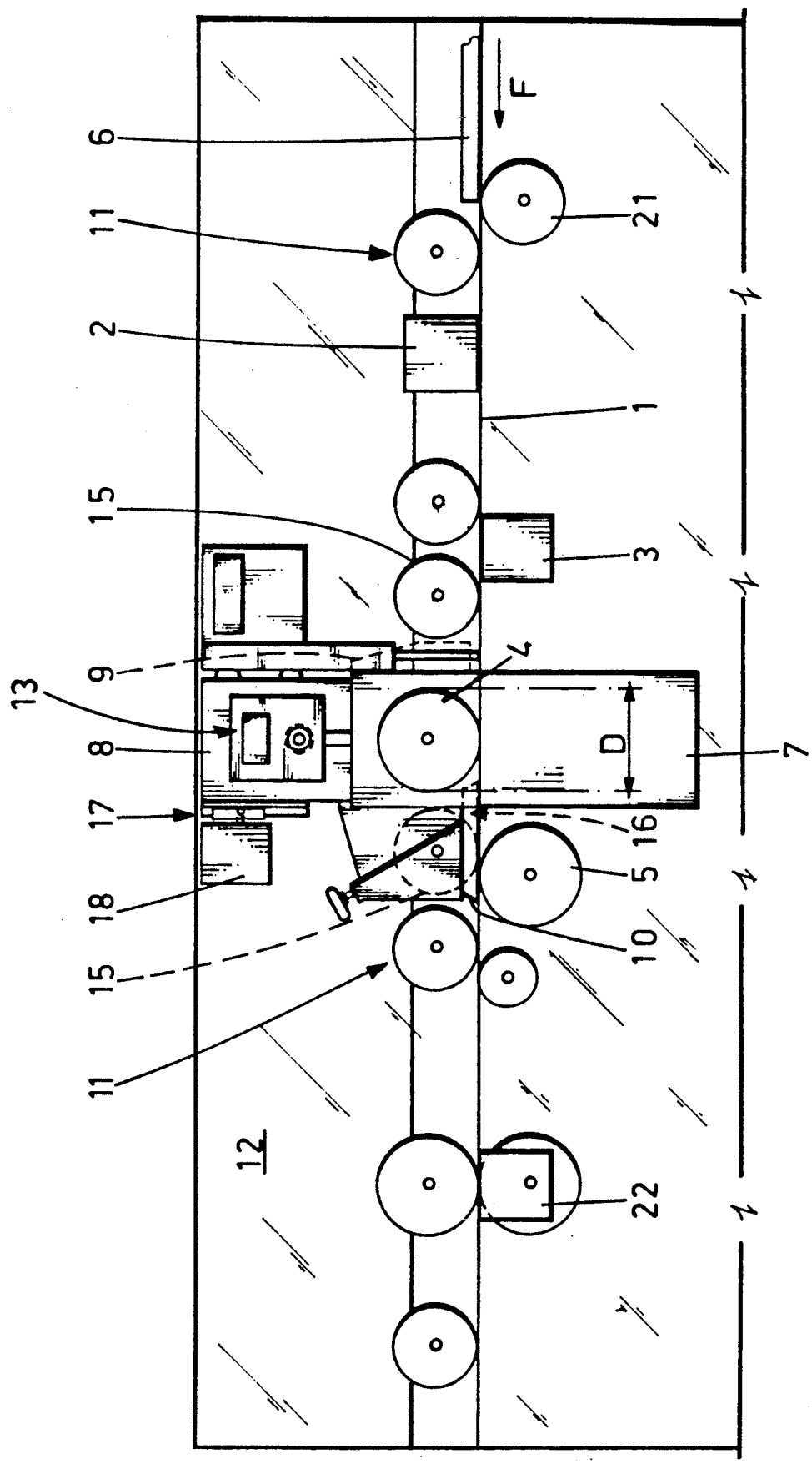
FIG. 1 is a front elevation, showing an arrangement of tools and feed wheels in a through feed molder according to the invention, from which certain parts are omitted to better illustrate other parts;.

Also illustrated in FIG. 1 are two additional tools installed respectively at the start and finish of the molding cycle, which tools may contribute to the machining operation according to the format of the work 6. In FIG. 1, these additional tools are a planer 21, located at the entry end, in relation to the feed direction F, and a universal cutter 22 installed at the exit end for shaping angled surfaces.

Figure 2:
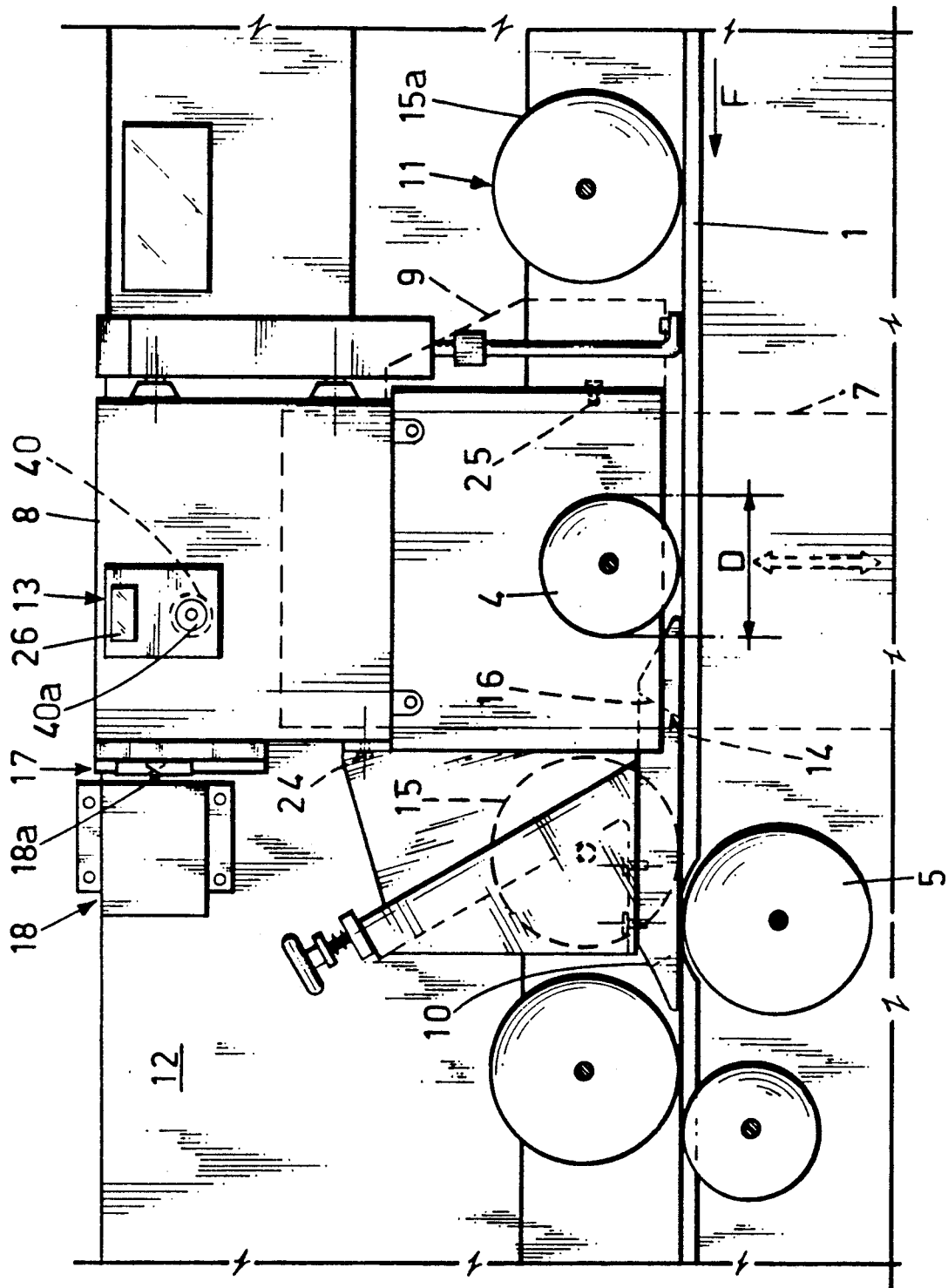
FIG. 2 is a front elevation of one of the cutting tools in the molder of FIG. 1, from which certain parts are omitted to better illustrate other parts.

Each tool 2, 3, 4 and 5 is mounted to a respective slide 7, which has a position in relation to the machine that depends on the type of the associated tool. These slides 7 (one only is illustrated in FIG. 1) vary the operating clearance of the tool in relation to a given datum, or work face, which coincides with the horizontal bed 1 in the tool shown in FIG. 1 by way of example. Also associated with each of the four tools 2,3, 4 and 5, positioned preceding and following in close proximity to each side of an associated tool hood 8, are hold-down elements 9 and 10 which include a pair of guides of which the first guide 9 encountered by the work 6 is angled in relation to the bed 1, and the second guide 10 is disposed parallel thereto (FIG. 2), in such a way as to direct and steady the work, respectively, during the cutting stroke.

FIG. 1 also illustrates roller means 11 comprising a plurality of steel or rubber faced wheels 15 spaced along the entire length of the horizontal bed 1 and mounted to a back rail 12 which flanks the bed at the rear, as viewed in the drawings. These same wheels 15 feed the work 6 from one tool to the next, and are rotatable about respective axes disposed transversely to the longitudinal axis of the horizontal bed 1.

The disclosed improvement provides each tool 2, 3, 4 and 5 with an associated hood 8 and connects the two hold-down guides 9 and 10 rigidly with the hood, one on each side of the hood by means of respective screw fasteners 24 and 25.

The hood 8 is further equipped with adjustment means 13, operating between the hood itself and the slide 7, by which the position of the hood 8 can be varied in relation to the horizontal bed 1 commensurately with a reference diameter D assigned to the tool. This diameter is determined at each tool change using the nominal diameter of the tool. In greater detail, the adjustment means 13 operating between the hood 8 and the slide 7 includes a lead screw mechanism 40 of conventional embodiment (illustrated schematically in phantom line), and a handwheel 40a mounted to the exterior of the hood 8 giving simple and sure operation. Such a mechanism is connected in turn to respective indication means, which in a simple embodiment is a graduated scale preferably in conjunction with a display 26 showing the value of the tool reference diameter D.

The second hold-down guide 10, i.e., positioned following the top horizontal tool 4 along the feed path F, includes a housing 14 (see FIGS. 2 and 3 in particular) in which is housed one of the feed wheels 15, supported by the rail 12.

More exactly, the second hold-down guide 10 includes a housing 14 having an outward facing recess 16 sunk into the face of the guide 10 and directed toward the back rail 12. The wheel 15 is keyed to the rail 12 and received partly within the recess 16.

Profiled means 17, connected with the side of the hood 8, engage switches 18a and 18b of a control device 18 mounted to the back rail 12 on adjustment of the distance separating the hood 8 from the horizontal bed 1. Such means 17 include conventional cam elements which allow the wheels 15 to adapt to the position assumed by the second hold-down guide 10 within a prescribed range of movement. With this construction, the height of the hood 8 can be adjusted without causing any interference between the second hold-down guide 10 (rigidly associated with the hood) and the feed wheel 15.

With the improved construction described above, it is possible to reduce the distance between centers of the feed wheel 15a, preceding the two horizontal tools (see FIG. 2), and the next wheel 15 encountered thereafter, in comparison to conventional through feed molders. Accordingly, there is no longer any need, even when machining stock of more limited longitudinal dimensions, to rely on the jogging action of successive workpieces in ensuring passage of the work beyond the horizontal tools.

I claim:

1. A through feed molding machine for woodworking a work piece, comprising:
   a horizontal feed bed for supporting a work piece and for transporting said work piece along a feed path during machining;
   a plurality of tools positioned in close proximity to said feed bed for machining four sides of said work piece, each said tool having a cutting edge;
   a plurality of tool slides, each said tool being supported by a respective slide, the position of each said slide and thereby a cutting edge of the associated tool being adjustable in a direction normal to the face being machined;
   a plurality of protective and dust collecting hoods, one said hood being mounted to each said slide, respectively;
   adjustment means operating between the hood and the tool side for moving said hood relative to said slide and adjusting the clearance between the hood and the work face of a work piece when a work piece is machined, said adjustment being commensurated with a reference diameter assigned to the tool;
   roller means spaced along the length of said horizontal bed, said roller means being mounted to a rail extending parallel to the bed, said roller means feeding said work piece from one tool to the next;
   hold down means associated at least with one of the tools, and including a first guide and a second guide rigidly attached to the sides of said hood in positions respectively preceding and following the associated tool along the feed path, and serving to direct and steady the work through the cutting stroke of the tool, said second guide comprising a housing, one of said plurality of roller means mounted to the rail being received at least in part in said housing.

2. A molding machine as in claim 1, wherein said roller means is a plurality of feed wheels, each said feed wheel being rotatable about an axis disposed transversely to the longitudinal axis of the horizontal bed, said housing having an exposed recess facing and positioned in coincidence with a portion of said rail to which said received wheel is keyed.

3. A molding machine as in claim 1, further comprising cam means connected with a side of said hood and a control device connected with said supporting rail, said cam means interacting with said control device to move said received roller means in order to follow movement of said second guide, said following movement being limited within a prescribed range of positional values when said hood is moved.

4. A molding machine as in claim 1, wherein said second guide is associated with a horizontal tool positioned to machine a top horizontal face of a work piece, said horizontal tool being one of said plurality of tools.

* * * * *